United States Patent [19]
Michel et al.

[11] Patent Number: 6,041,118
[45] Date of Patent: Mar. 21, 2000

[54] ARCHITECTURE FOR TELEPHONE SET

[75] Inventors: Alan Dean Michel, Nobleville; Eric Williams, Indianapolis, both of Ind.

[73] Assignee: Lucent Technologies Inc., Murray Hill, N.J.

[21] Appl. No.: 08/787,487

[22] Filed: Jan. 22, 1997

Related U.S. Application Data

[63] Continuation-in-part of application No. 08/363,454, Dec. 22, 1994, abandoned.

[51] Int. Cl.[7] .................................................. H04M 1/00
[52] U.S. Cl. ........................ 379/391; 379/394; 379/402; 379/406
[58] Field of Search .................................... 379/390, 391, 379/392, 394, 395, 402, 403, 404, 406, 410, 67, 52

[56] References Cited

U.S. PATENT DOCUMENTS

| | | | |
|---|---|---|---|
| 4,540,855 | 9/1985 | Szlam et al. | |
| 4,757,527 | 7/1988 | Benston et al. | 379/410 |
| 4,796,287 | 1/1989 | Reesor et al. | 379/390 |
| 4,811,342 | 3/1989 | Huang | 370/32.1 |
| 4,926,459 | 5/1990 | Advani et al. | 379/52 |
| 5,351,291 | 9/1994 | Menez et al. | 379/410 |
| 5,359,653 | 10/1994 | Walker et al. | 379/390 |
| 5,450,081 | 9/1995 | Kuhn et al. | 341/94 |
| 5,471,528 | 11/1995 | Reesor | 379/390 |
| 5,483,577 | 1/1996 | Gulick | 379/67 |
| 5,533,119 | 7/1996 | Adair et al. | 379/391 |
| 5,555,300 | 9/1996 | Gutzmer | 379/395 |
| 5,657,384 | 8/1997 | Staudacher et al. | 379/388 |
| 5,696,819 | 12/1997 | Suizu et al. | 379/390 |

*Primary Examiner*—N. Le
*Assistant Examiner*—Shih-Wen Hsieh

[57] ABSTRACT

The invention concerns digital processing of analog signals in a telephone set. A signal path runs between a telephone line and the handset of the telephone. A digital signal processor is interconnected within this signal path, together with appropriate analog-to-digital, and digital-to-analog, converters. This approach allows digital processing of the information carried by the signal path. The digital processing facilitates, for example, (1) a high degree of separation of the handset's microphone signal from the received signal, and (2) independent control of volumes of the received signal and sidetone.

7 Claims, 5 Drawing Sheets

ARCHITECTURE FOR TELEPHONE SET

This is a Continuation-in-Part of Ser. No. 08/363,454, filed on Dec. 22, 1994, now abandoned.

The invention concerns circuitry for a telephone, which allows a user to control sidetone volume independently of received signal volume.

BACKGROUND OF THE INVENTION

FIG. 1 schematically illustrates four-wire telephone operation. One pair of wires carrier a signal from the microphone MIC of a first handset to the receiver RCVR of a second handset. (Intermediate electronics are, of course, not shown.) Another pair carries a corresponding signal, but in the reverse direction, from the second to the first handset.

Two-wire operation is perhaps more common than four-wire operation. One reason is that, historically, as telephone networks were installed, the less expensive option of installing two, rather than four, wires was taken.

In two-wire operation, a pair of wires carries both signals, which travel in two directions, as shown in FIG. 2. Hybrid circuits, also called duplexers or simply "hybrids," separate the signals, as indicated. In a sense, the hybrids convert four-wire operation into two-wire operation, and vice-versa.

FIG. 2 illustrates two-wire transmission carrying a local call, which does not involve transmission between Central Offices (CO's). However, two-wire service is not required in local calls; in some types of local calls, four-wire transmission is employed. In addition, if the call does require CO-to-CO transmission, then four-wire transmission is generally used.

FIG. 3 illustrates the design of a common hybrid. $Z_L$ represents the impedance of the two-wire line feeding the hybrid. A figure of merit for the hybrid is transhybrid loss (THL), which is given by the expression $|Z_h+Z_L|/|Z_h-Z_L|$, wherein the Z's represent the impedances shown in the Figure.

Transhybrid loss is a measurement of the coupling from the hybrid's INPUT PORT with its OUTPUT PORT, which are so-labeled in FIG. 3. To completely isolate the INPUT PORT from the OUTPUT PORT, THL should be infinite.

However, THL is deliberately made non-infinite, in order to introduce some coupling, or feedback. Some feedback is desirable, primarily to allow a user to hear the user's own voice in the receiver, or earpiece, of the handset. This feedback is termed "sidetone." Without sidetone, the telephone would sound dead.

Even without deliberately attempting to create sidetone, which requires non-infinite THL, nevertheless, THL will, in practice, attain non-infinite values in almost all situations. The main reason is that $Z_L$ in the expression above is almost always a complex quantity (as the term "complex" is used in electrical engineering), and is actually a distributed impedance, whereas the $Z_h$'s within the hybrid are lumped impedances. An exact match between the lumped $Z_h$ and the distributed $Z_L$, which is required to attain infinite THL, is highly unlikely. Further, even if a match is attained, it will exist only at a single frequency. Therefore, the occurrence of sidetone is, for practical purposes, inevitable.

Moreover, when sidetone is deliberately introduced, by choosing a non-infinite THL, the sidetone will not remain constant, because of the variance in THL described immediately above: the sidetone depends on THL, and THL varies as $Z_L$ varies.

Therefore, prior-art hybrids produce sidetones. The sidetones have a loudness level which depends on the impedance of the line, which is different at different locations. Moreover, for a single telephone at a single location, sidetone can vary as conditions vary. For example, picking up an extension telephone set will add a parallel impedance to Z which changes the original $Z_h$.

Sidetone varies for another reason. If a volume control is used to change the volume of the received signal, the control also changes the sidetone level. The reason is that, in practice, the received signal inevitably contains sidetone, because the transmitted signal, containing the user's voice, is reflected by the telephone transmission system. Therefore changing the level of the received signal will also change the overall sidetone level.

In addition, even if there were no reflections, and even if the absolute level of the sidetone were held fixed, changing the volume of the received signal would change the relative volume of the sidetone, which may be undesirable. For example, if the received signal were increased in volume, the ratio of received signal to the (fixed) sidetone would increase.

It may be possible, by using elaborate and expensive filtering schemes, to isolate sidetone from the received signal. However, commercially available telephone sets do not generally use such schemes, primarily to avoid excess cost and complexity.

SUMMARY OF THE INVENTION

In one form of the invention, a telephone set produces digitized versions of its received signal and its microphone signal. The invention allows a user to amplify the received signal to a desired degree. The invention allows the manufacturer to set the amount of sidetone, at the time of manufacture. The invention mixes the two signals together, and delivers the mixed signal to the receiver. Thus, sidetone volume is controllable, independent of received signal volume.

An adaptive filter can be added to detect the level and time delays of transmitted signal reflections, which contaminate the received signal. The filter subtracts various time-delayed fractions of the locally transmitted signal from the received signal, in order to reduce apparent transhybrid coupling.

BRIEF DESCRIPTIONS OF THE DRAWINGS

DETAILED DESCRIPTION OF THE INVENTION

Figure 4:
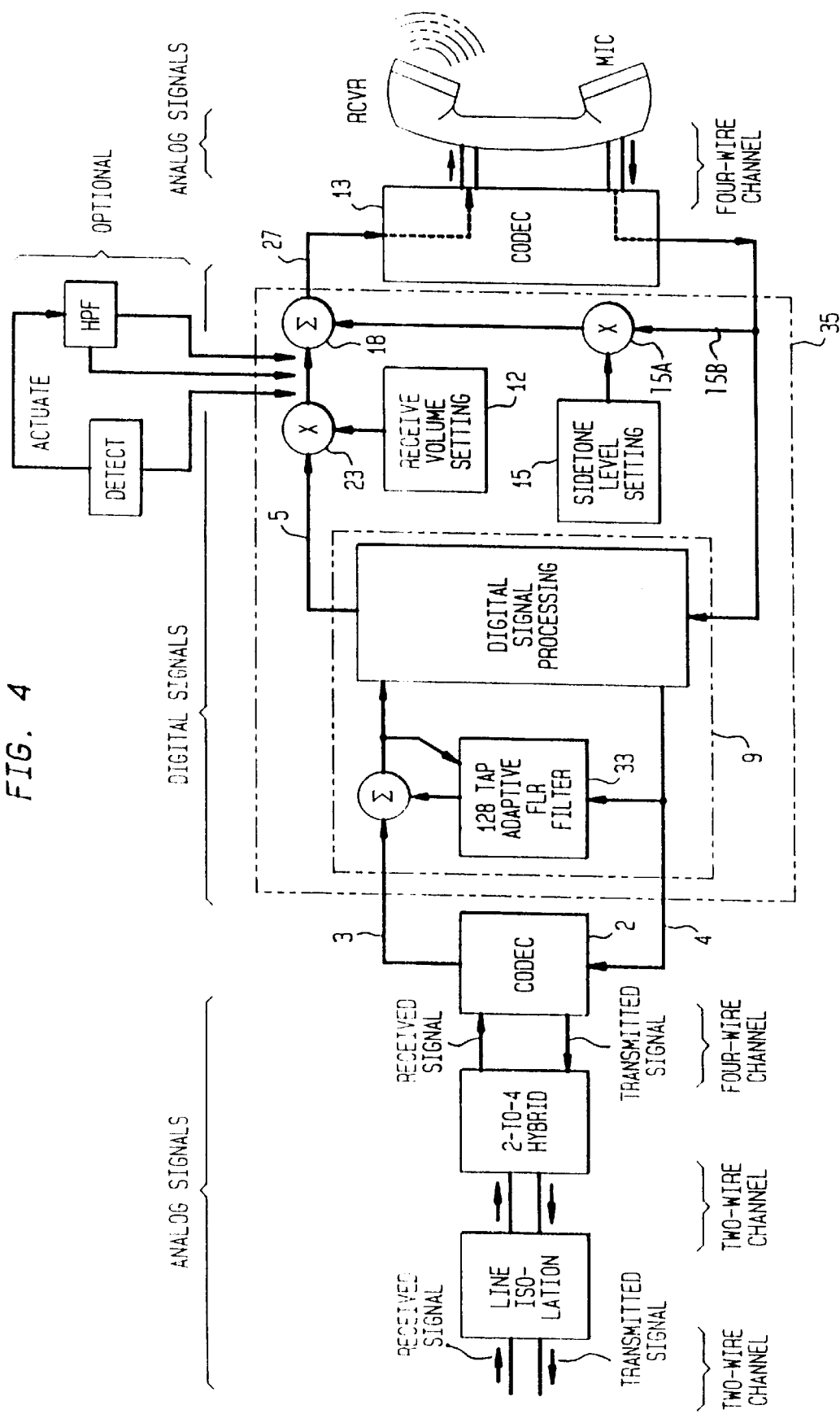
FIG. 4 illustrates one form of the invention.

FIG. 4 illustrates one form of the invention. A two-wire telephone channel is located at the left. A block labeled LINE ISOLATION performs its usual function. A 2-to-4 hybrid connects with the two-wire channel, allowing the TRANSMITTED and RECEIVED signals to be separated, as indicated. As the Figure indicates, the signals discussed so far are analog in type.

A codec 2 (which is an acronym for coder/decoder) performs analog-to-digital conversion, in converting the analog signal received from the two-wire channel into a digital signal on bus 3. The codec also performs the reverse operation, namely, digital-to-analog conversion, in converting a digital signal, received on bus 4, into analog form, for transmission to the two-wire channel. The codec may also perform an anti-aliasing function, if desired. Codecs which perform all three functions are known in the art.

The components contained in dashed block 9 will be discussed later. Block 12, which is controlled by the user, adjusts the volume of the received signal. This volume is adjustable independently of the transmitted signal. As the Background of the Invention explained, this independent adjustment is not easily available in the prior art.

Bus 5, which contains the digitized received signal, contains no contamination from the microphone signal, because no hybrid, or other cross-talk-producing apparatus, is interconnected between the microphone MIC of the handset and this bus. Further, as will be discussed in greater detail later, reflections of the transmitted signal, which contaminate the received signal, are greatly reduced on this bus. Therefore, bus 5 can be said to contain a substantially pure version of the received signal.

Digitize Microphone Signal

The signal transmitted from the microphone of the handset is digitized by codec 13. Block 15 sets the sidetone level. Block 15 is programmed by the manufacturer, to provide a desired volume of microphone signal. For example, block 15 can represent a digital memory, which stores a number, or weight. That number is multiplied by the digital microphone signal carried by line 15B, in multiplier 15A, producing a weighted microphone signal. The weighted microphone signal is added to the received signal in summer 18.

Allowing the manufacturer to determine the volume of the sidetone by programming block 15 allows a single, base, telephone set to be sold in different countries, which have different requirements for sidetone level.

Multiplication

Blocks 12 and 15, and their associated multipliers 15A and 23, can be viewed as performing a multiplication function, in multiplying the respective signals by a number provided by the respective block. In the case of block 12, this number is under control of the user. In the case of block 15, this number is not under control of the user, but under control of the manufacturer.

For example, assume that a user wished to double the received volume. The received signal, at multiplier 23, is a sequence of binary numbers, each representing a sampled analog voltage. To double a binary number, one shifts the decimal point one place to the right. It is known in the art how to perform such shifting, and how to multiply binary numbers by any selected number supplied by the user. If the processing is done by computer, rather than dedicated hardware, the multiplying can, of course, be done in software.

Summation

Summer 18 thus receives a weighted received signal, from multiplier 23, and a weighted microphone signal, from multiplier 15A. It mixes them, and produces a digital signal on line 27 which is delivered to codec 13. The codec 13 converts this signal to analog form, and delivers it to the receiver RCVR contained within the handset. The user, not shown, hears the signal produced by the receiver RCVR.

Digital Signal Processing Block

The block labeled DIGITAL SIGNAL PROCESSING represents processing circuitry which can perform operations which are practical to execute within the digital domain. Some examples are voice recognition, solid state voice storage (as in answering machines), recognition of a caller's identification code, Dual Tone Multi Frequency (DTMF) generation and detection, etc.

Adaptive Filter

Block 33 indicates an adaptive filter. Such filters are known in the art. In simple terms, such a filter stores multiple samples of a transmitted signal, and then looks for various time-delayed versions of that signal on the telephone line. These time-delayed versions represent reflections of the outgoing signals. When these reflected signals are detected, the filter 33 ascertains (a) their magnitudes, and (b) their time delays.

Knowing these two factors, the filter then uses the stored samples to subtract a signal of the proper magnitude, at the proper time, in order to remove the reflected signals from the received signal. This approach removes sidetone contamination from the received signal caused by a mismatch of line-hybrid impedances or impedance mismatches within the line itself.

Important Considerations

1. FIG. 4 shows the adjustment of (a) sidetone volume and (b) received signal volume as being performed in the digital domain. It could also be performed in the analog domain. For example, the multiplication and mixing could be moved to the right of the codec 13. Alternately, either of the volume controls may be made digital, and the other made analog.

Figure 1:
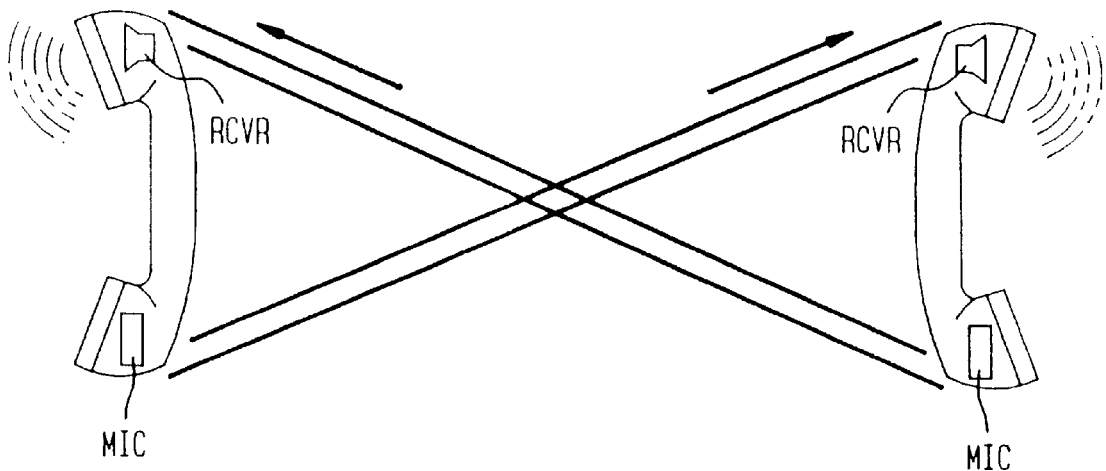
FIG. 1 is a highly schematic representation of four-wire telephone transmission.
Figure 2:
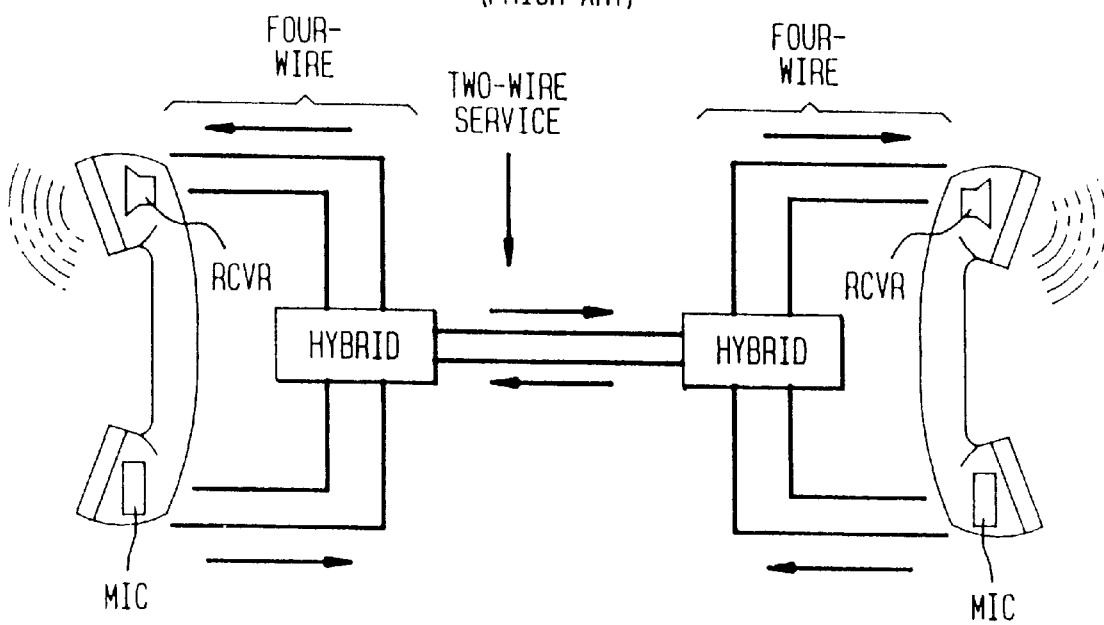
FIG. 2 is a highly schematic representation of two-wire telephone transmission.
Figure 3:
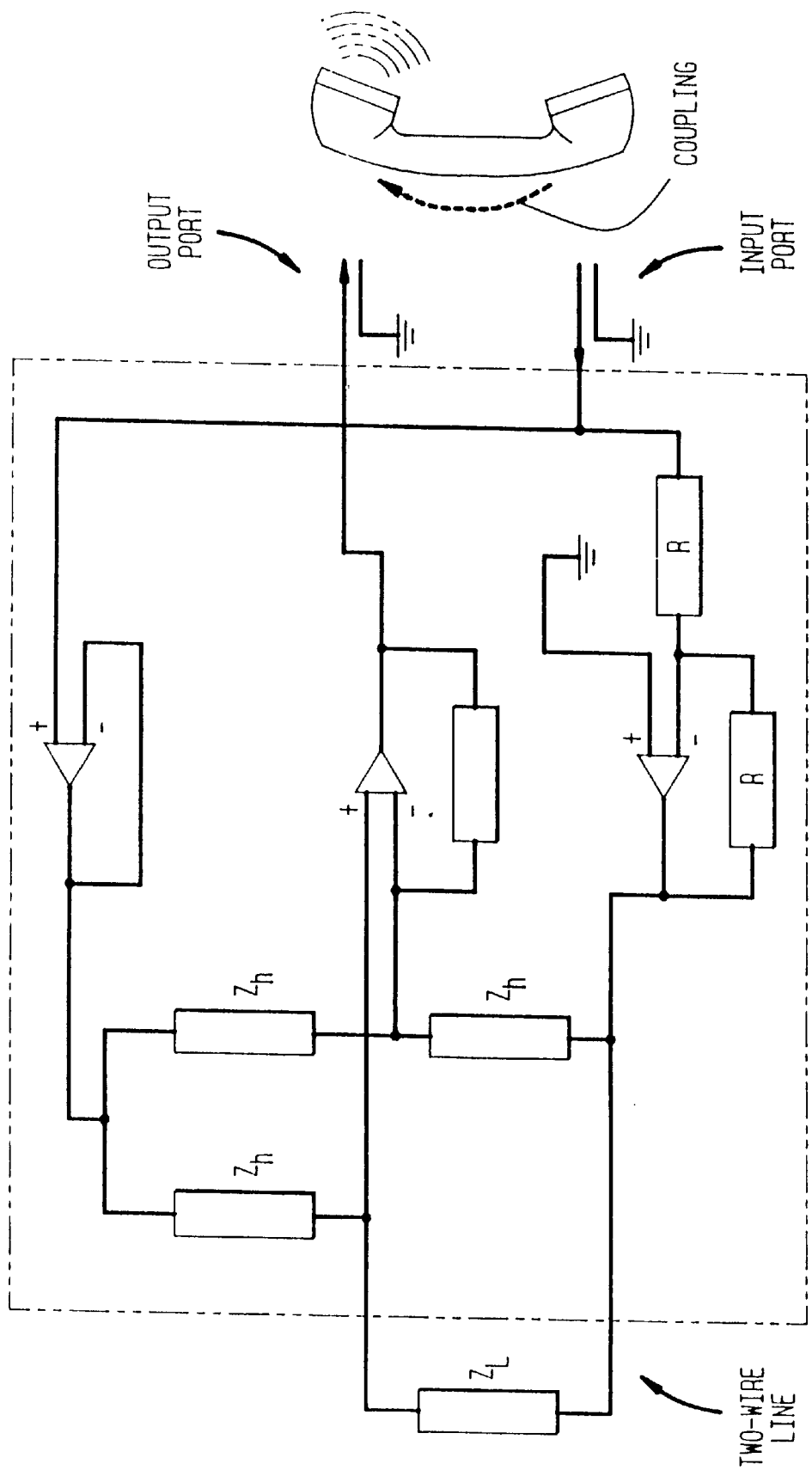
FIG. 3 illustrates a prior-art hybrid.

2. The amount of sidetone is independent of the line impedance, $Z_L$ in FIG. 3. Transmitted reflections have been largely eliminated from the received signal, so that little or no microphone sidetone is contained within the received signal, on bus 5. The amount of reflection-induced sidetone depends on the amount of reflection which is reduced by filtering.

3. The 2-to-4 HYBRID in FIG. 4 acts as an interface between two-wire service and four-wire service. Codec 2 acts as an interface between four-wire service and a digital bus, or the digital processing system represented by dashed block 35. Codec 13 acts as a similar type of interface.

4. The invention provides an increase in transhybrid loss (THL) over that which is normally found in prior-art hybrids. For example, common THL values in prior art hybrids range from 0 dB to 10 dB, and values in the range of 8 dB to 10 dB are common.

The invention, by use of the adaptive filter shown in FIG. 4, is expected to increase THL by at least an additional 6 dB, and, more likely, by an additional 12 dB to 15 dB, or more.

5. The invention can change the frequency response of the received signal, in order to assist persons having hearing impairment. For example, high frequencies can be boosted, by a first-order, high-pass filter HPF, having a cut-off frequency at 1 KHz, and having a boost of 6 dB per octave, positioned as shown in FIG. 4. It is to be emphasized that the HPF does not block frequencies below the cut-off frequency, but boosts the high frequencies. The low frequencies are still passed.

At volume settings below a predetermined value, this filter is not used. At volume settings above this value, which indicate that a hearing-impaired person is perhaps setting the volume, the filter is inserted, causing a boost in the high frequencies of the received signal. A DETECTOR detects the higher volume, and actuates the high-pass filter HPF. Such filters, and their actuation, based on the volume setting of block 12, are wellknown.

Identical processing of the sidetone signal can be undertaken, if desired, in order to boost the high-end frequencies of the sidetone.

Figure 5:
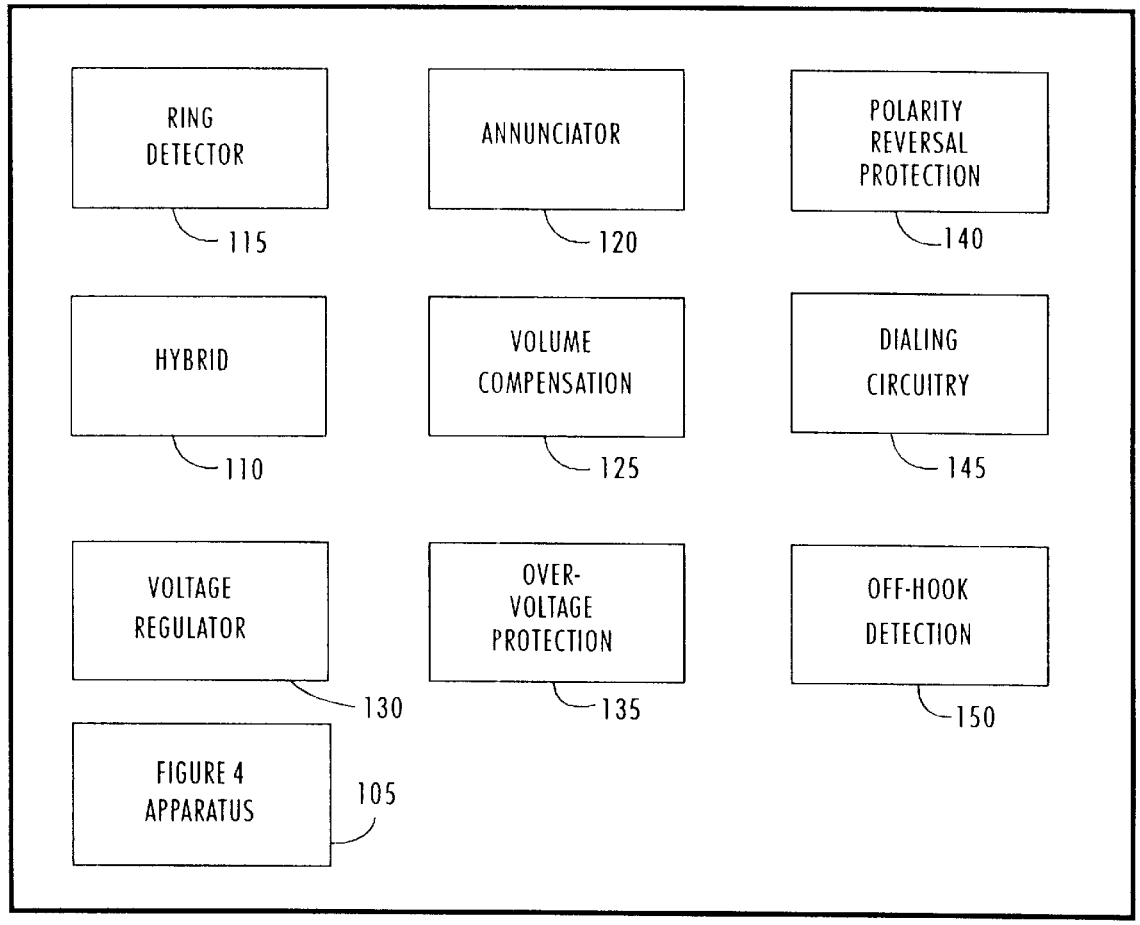
FIG. 5 illustrates one form of the invention, which includes components found in a prior-art telephone.

6. FIG. 5 illustrates selected components which are known in the prior art. The invention, indicated by block 105, is incorporated into a telephone 100 which contains one, or more, of these components.

Hybrid

Figure 6:
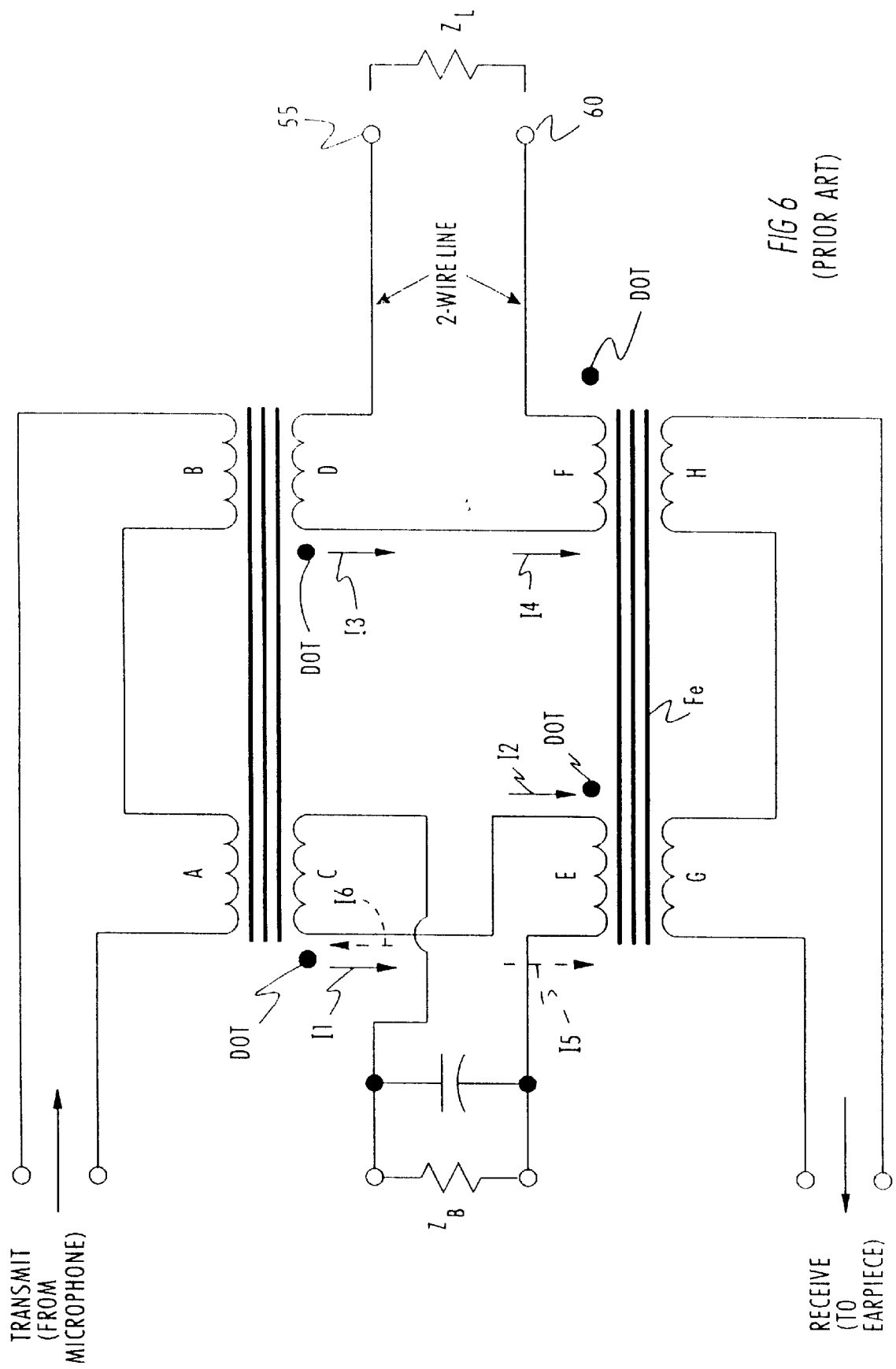
FIG. 6 is a schematic of a prior-art hybrid.

FIG. 5 illustrates a hybrid 110. FIG. 6 illustrates a simplified schematic of one type of hybrid. The TRANSMIT terminals receive signals from a microphone (not shown), and the RECEIVE terminals deliver signals to an earpiece (not shown). The hybrid performs four primary functions:

1. For signals received from the TRANSMIT terminals, the hybrid:
   a) delivers the signals to the 2-WIRE LINE, which leads to the telephone company's central office, and
   b) blocks those signals from reaching the RECEIVE terminals (an exception to this statement is discussed later).
2. For signals received from the 2-WIRE LINE, the hybrid:
   a) delivers the signals to the RECEIVE terminals; and
   b) blocks those signals from reaching the TRANSMIT terminals.

The hybrid of FIG. 5 performs these functions as follows.

Four transformers are shown, containing coil-pairs A/C, B/D, E/G, and F/H. The turns-ratio of all of these pairs are identical. When a signal is received from the TRANSMIT terminals, a current is generated in coils A and B. These currents generate currents I1 and I3 in coils C and D, respectively. (The currents under consideration are phasor currents, and not DC currents.) Current I3 passes through coil F, as current I4, and reaches the 2-WIRE LINE, and thence the telephone company switching station (not shown). Impedance $Z_L$ represents all impedances located to the right of terminals 55 and 60, including the telephone lines, and those internal to the switching station.

Current I1, generated by coil C, passes through coil E, as current I2, and also through a balancing impedance $Z_B$. Balancing impedance $Z_B$ is chosen as equal to $Z_L$, so that current I1 equals I3, and I2 equals I4.

Coils E and F are connected so that the flux attributable to current I2 cancels that attributable to current I4. That is, current I2 enters coil E at the reference DOT, while current I4 enters coil D opposite the reference DOT. Thus, currents I2 and I4 generate magnetic fluxes in the transformer iron Fe which cancel each other. (In contrast, a similar analysis of coils A and B will indicate that their fluxes are additive.)

Since balancing impedance $Z_B$ is chosen to equal impedance $Z_L$, currents I2 and I4 will be equal, so that the fluxes in transformer iron Fe will cancel exactly. Thus, no signal received from the TRANSMIT terminals reaches the RECEIVE terminals.

For a signal received from the 2-WIRE LINE, the analysis is similar. That received signal generates current I3, which equals current I4. Current I4 enters coil F opposite the DOT, and thus generates current I5 in coil E, which is different from current I2, previously discussed. Current I5 is also opposite the DOT. These two currents I4 and I5 generate fluxes which add within the iron Fe, and thus produce a signal within coils G an H, which reach the RECEIVE terminals.

However, current I5 equals current I6, which enters coil C at its DOT. Thus, the currents in coils C and D generate fluxes which are mutually cancelling, and the signal received from the 2-WIRE LINE is blocked from reaching the TRANSMIT terminals.

In actual practice, the hybrid is not designed to be perfectly balanced, and a fraction os the signal from the TRANSMIT terminals is allowed to reach the RECEIVE terminals, in order to create the sidetone discussed earlier.

In addition, it is not strictly necessary that the combination of transformers shown in FIG. 6 be used as the hybrid. Other circuits can be used.

Ring Detection

The telephone of FIG. 5 contains a ring detection circuit 115. The ring-detection circuit performs two primary functions: (1) it detects a ring signal, which is an AC signal generated by the telephone company's central office, and (2) it draws no DC current from the 2-WIRE line. AC-coupling of the ring detection circuit 115 with the telephone lines is commonly used to accomplish these two goals. Alternately, a detector having a high input impedance can be used.

Annunciator

The telephone of FIG. 5 also contains an annunciator 120. Older telephones used brass bells, which were struck by a clapper, which was energized by the ring detector circuit. Newer telephones use other sound-generation devices, which are actuated by the ring detector circuit 115.

Volume-Compensation Circuits

Different telephones will be located at different distances from the telephone company's central office, which is the source of the signals reaching the telephone. The more distant telephones will receive weaker signals, while the less-distant telephones will receive stronger signals. However, it is desirable that all signals produce sounds of approximately the same volume in the earpiece of the telephone.

A volume-compensation circuit 120 in FIG. 5 achieves uniformity of volume.

Voltage Regulator Circuits

Many telephones derive their operating power from the telephone lines. However, the voltage carried by the lines does not remain constant. In telephones utilizing solid-state devices, a relatively constant voltage can be required. In these telephones, a voltage regulator circuit 130 is used, to regulate the voltage.

Over-voltage Protection

Telephone lines are subject to lightening strikes. If telephones connected to these lines utilize solid-state amplifiers, the lightening strikes can damage the amplifiers, and other electronics. Overvoltage protection 135, or surge protection, prevents this damage. A Zener diode provides a simple example of over-voltage protection.

Polarity Reversal Protection

In a DC circuit, one wire is positive, and the other wire is negative. A telephone containing solid state devices may derive DC operating power from the telephone lines. However, it is possible that the polarity of the DC circuit may become reversed, when delivered to the telephone, as when a homeowner installs telephone wiring and jacks, and connects wires in a non-conventional manner.

Telephones can contain polarity reversal protection 140, to prevent this reversal from causing damage. A diode bridge, commonly used in full-wave rectification of AC power, illustrates one type of protection.

Dialing Circuits

Dialing circuits 145 transmit signals to the telephone company's central office, indicating the telephone number to be dialed. Two primary types are in use.

One type is "pulse" dialing, wherein a sequence of pulses is used, each spaced by a fixed delay from the other. For example, a sequence of three equally spaced pulses indicates the number "3"; a sequence of four equally spaced pulses indicates the number "4"; and so on.

Another type is "tone" dialing, wherein every number is represented by a unique pair of tones. "Tone" dialing is also called "DTMF" signalling.

Off-Hook Detection

A detector is required to inform the telephone central office when the handset is taken "off-hook," so that the central office can look for dialing signals. A common detector takes the form of two switches.

When the handset rests in its cradle, the switches are open, and the telephone lines reaching the telephone sees an open circuit. However, when the handset is withdrawn from its cradle, the switches close, placing the electronics of the telephone across the telephone lines, which draw a current. The central office detects the current, and infers that the telephone will soon issue a dialing sequence.

All components shown in FIG. 5, except the "FIG. 4 APPARATUS" indicated in block 105, are known in the prior art. They are discussed in *Understanding Telephone Electronics,* by Fike and Friend (1984, Sams Publishing Co., Indianapolis, Ind.), ISBN 0672-27018-8. This book is hereby incorporated by reference.

Numerous substitutions and modifications can be undertaken without departing from the true spirit and scope of the invention. What is desired to be secured by Letters Patent is the invention as defined in the following claims.

What is claimed is:

1. A communication apparatus, comprising:
    a) a telephone, in which a signal path runs between
        i) a handset, which produces and receives analog signals, and
        ii) an input, which is connectable to an analog telephone line;
    b) a digital signal processor (DSP), interconnected in the signal path, for communicating with both the input and the handset;
    c) interfaces, for interfacing between
        i) the telephone line and the DSP, and
        ii) the DSP and the handset;
    d) a digital high-pass filter, for boosting high frequencies in received signals;
    e) means for adjusting volume of signals produced by the receiver; and
    f) means for detecting when said volume exceeds a predetermined level and, in response, activating said high-pass filter.

2. In a telephone set, for connection to a telephone line, which includes:
    1) a hybrid;
    2) a handset, which contains
        A) a receiver for producing sound, and
        B) a microphone for converting sound into analog signals;
    3) a ring detector, for detecting ring signals on the telephone line;
    4) an annunciator, which responds to the ring detector;
    5) volume-compensation circuitry, which reduces variation in volume of sound produced by the receiver; and
    6) over-voltage protection, for protecting against voltage spikes on the telephone line;
the improvement comprising:
    a) memory, for storing a number;
    b) means for producing a digital sidetone, of magnitude which depends on said number; and
    c) means for converting the digital sidetone to an analog signal, for delivery to said receiver.

3. Telephone set according to claim 2, and further comprising:
    d) means for allowing a user to control volume of sound produced by the receiver, independent of said magnitude.

4. A telephone set, comprising:
    a) a hybrid, which produces transhybrid loss (THL); and
    b) digital computation means for increasing said transhybrid loss through digital signal processing of audio signals.

5. Telephone set according to claim 4, wherein the hybrid alone produces THL in the range of 0 to 10 dB, and wherein THL is increased by more than 6 dB over that produced by the hybrid alone.

6. In a telephone set, the improvement comprising:
    a) means for digitizing signals received from a telephone line;
    b) high-pass filter means, for emphasizing high frequencies in said received signals; and
    c) means for selectively actuating said high-pass filter means.

7. Telephone set according to claim 6, wherein said high-pass filter means is effective to compensate a user's debility in hearing certain high frequency signals.

* * * * *